(12) United States Patent
Fulmer et al.

(10) Patent No.: US 6,352,095 B1
(45) Date of Patent: Mar. 5, 2002

(54) CARD STRAIGHTENER

(75) Inventors: Gary B. Fulmer; Darren W. Haas, both of Eden Prairie, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 09/429,944

(22) Filed: Oct. 29, 1999

(51) Int. Cl.$^7$ ............................................. B30B 15/34
(52) U.S. Cl. ...................... 156/387; 156/498; 156/555; 156/582; 156/583.1
(58) Field of Search ................................. 156/228, 311, 156/498, 499, 555, 580, 582, 583.1, 384, 387

(56) References Cited

U.S. PATENT DOCUMENTS

| | | | |
|---|---|---|---|
| 2,469,972 A | 5/1949 | Lowry et al. ................. | 154/42 |
| 2,707,018 A | 4/1955 | Bolton ......................... | 154/42 |
| 2,903,040 A | 9/1959 | Schonzeit ..................... | 154/1 |
| 3,067,469 A | 12/1962 | Yarrison ......................... | 18/55 |
| 3,367,261 A | 2/1968 | Kashiwagi ................... | 100/93 |
| 3,770,550 A | 11/1973 | Levitan ....................... | 156/498 |
| 3,901,758 A * | 8/1975 | Humphries ................. | 156/499 |
| 4,997,507 A | 3/1991 | Meyer ......................... | 156/286 |
| 5,673,076 A | 9/1997 | Nardone et al. ............. | 347/171 |

* cited by examiner

*Primary Examiner*—James Sells
(74) *Attorney, Agent, or Firm*—Westman, Champlin & Kelly, P.A.

(57) ABSTRACT

A card straightener is used for cooling a card that has been processed using heat, such as in a printing or lamination process. The card straightener includes a plate member that has a heat sink in heat conducting relation. The plate member is positioned to receive a card from the heated process. The card is passed over the plate and is urged against the plate so that the card is cooled while held flat while it becomes rigid, so it remains planar after cooling.

9 Claims, 4 Drawing Sheets

CARD STRAIGHTENER

CROSS REFERENCE TO RELATED APPLICATION

Reference is made to U.S. patent application Ser. No. 09/430,566 filed on Oct. 29, 1999 and entitled WASTELESS LAMINATOR and U.S. patent application Ser. No. 09/379,417, filed Aug. 23, 1999 for CARD LAMINATOR WITH REGULATORY CONTROL U.S. Pat. No. 6,264,774 and assigned to the same assignee as this application.

BACKGROUND OF THE INVENTION

The present invention relates to a card straightener which receives a card that has been processed through a heating process such as lamination, or printing and cools the card while it is supported so the card is planar when processed.

When plastic cards, such as ID cards, are laminated, the heat of lamination softens the cards and unless the cards are anealed in some manner they will curl or warp. The problem persists and is difficult to solve because of the requirement for compact printers and laminators.

One prior art device is illustrated in U.S. Pat. No. 5,673,076, and it uses a heated roller to relieve stresses in a card to straighten it.

SUMMARY OF THE INVENTION

The present invention relates to an improved card straightener that utilizes a flat plate that supports a softened card and cools it so it remains planar. The card may be spring-loaded against the plate, with a second plate. One or both plates can have heat sinks to increase the rate of cooling. The heat sinks have a series of metal fins, preferably, and at least one can be cooled with a fan which blows air over the fins for dissipating heat in a sufficient amount so that the plates will straighten curls or bends in the card. The cards will cool and become rigid and will remain planar.

DETAILED DESCRIPTION OF THE ILLUSTRATIVE EMBODIMENTS

Figure 1:
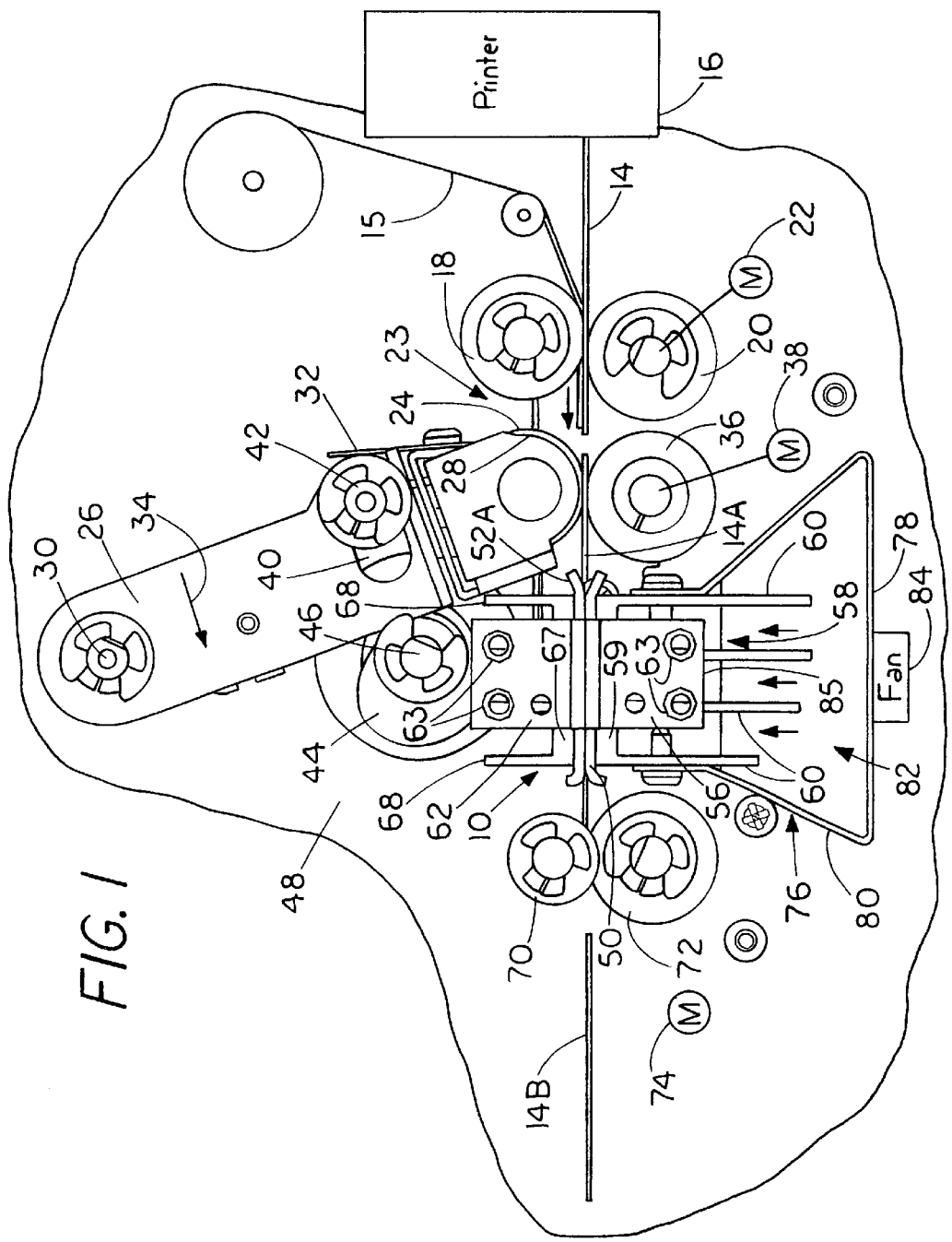
FIG. 1 is a side schematic view of a typical card processing system utilizing a card straightener made according to the present invention.
Figure 2:
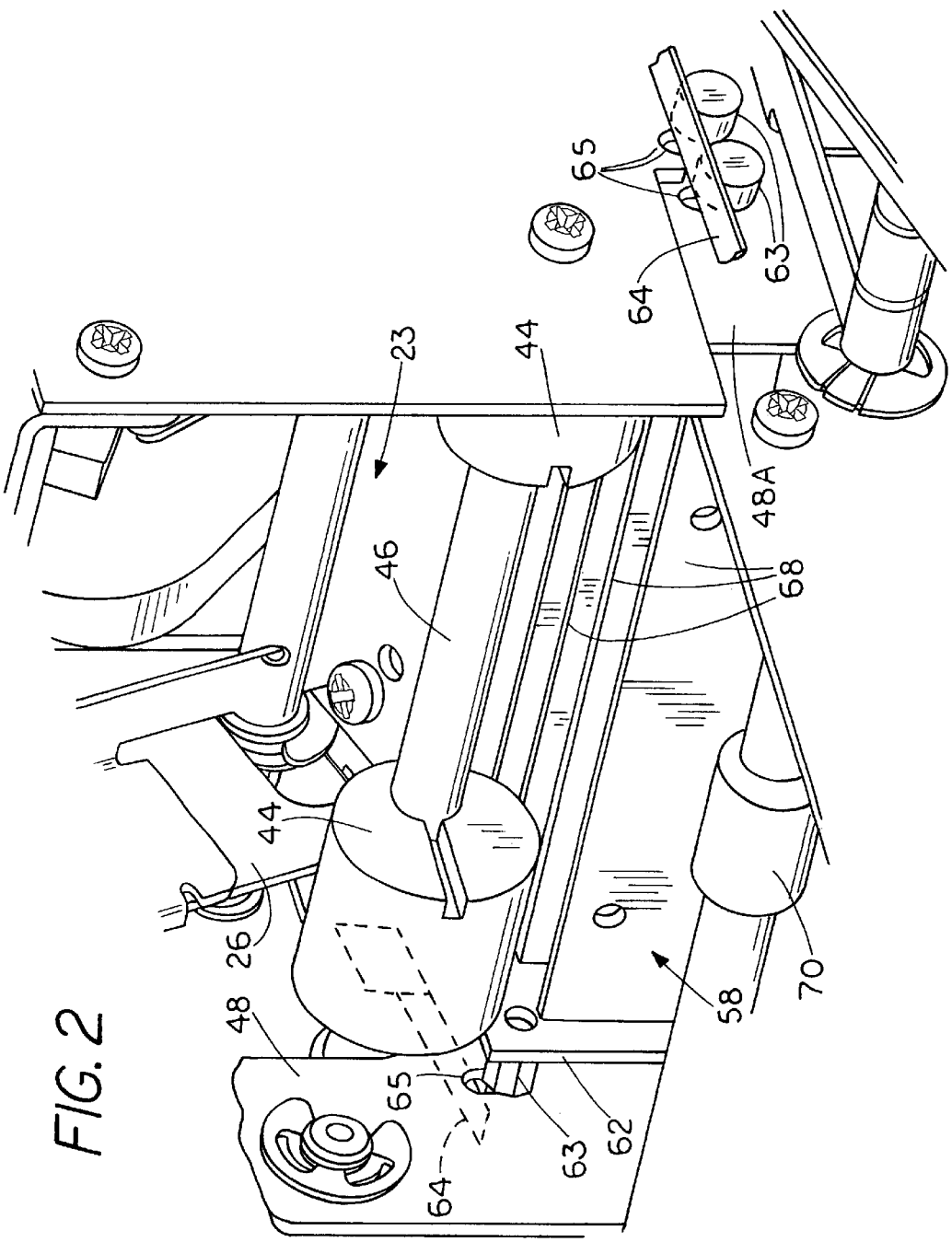
FIG. 2 is a perspective view of an upper heat sink used with the card straightener of FIG. 1.

FIG. 1 is a schematic representation of a card straightener apparatus illustrated generally at 10 that is shown on the output side of a laminating station 23, which receives cards shown at 14, 14A and 14B from a printer 16 of conventional design. The printer 16 prints onto the card 14, and the card 14 is transferred to a lamination station. A laminating film section that is to be applied with heat or bonded to the card 14 is also provided as illustrated schematically at 15. Reference is made to a U.S. patent application on the Wasteless Laminator identified above, and also U.S. Pat. No. 5,807,461 for another form of laminator.

The card 14 is fed with a pair of rollers indicated at 18 and 20, with the roller 20 being driven by a motor 22. The upper roller 18 is spring-loaded downwardly to provide a pinch action against the card 14 and feed it into a heated laminating station 23 comprising a heated roller 24 that is rotatably mounted on a pivoting frame 26. The heated laminating roller is provided with an internal heater, which is shown as a solid line 28, extending around the periphery of the roller.

The frame 26 is pivotally mounted on a pivot axis shown at 30 using suitable pins, and is spring-loaded with a leaf spring 32 in the direction that is indicated by the arrow 34. A drive roller 36, which is driven from a motor 38, will drive the card through the laminating station as the laminating film is adhered to the card using heat. The card and the laminating film material are both heated by the heater 28 as the roller 24 rotates. The laminator itself can be any desired type that heats the lamination film and card.

The frame 26 can move about the axis of the pin 30 as constrained by a slot 40 in a side member of the frame 26 through which a shaft 42 extends. A cam shown at 44 is mounted on a cross shaft 46 on suitable supports on side frame members, one of which is shown at 48, and rotated so the laminating roller can be lifted away from the drive roller 36 if desired.

As the card 14 and laminating film sections are fed by the drive roller 36 through the lamination station, the card is heated to a level where it becomes softened and will deform or curl unless further processed to maintain it straight. The straightening process is carried out as the card passes through the card straightener apparatus 10.

The hot roller 26 heats the card and laminate, which generally has an adhesive on the side of the laminate that can stick to the card, and when the adhesive is laminated it is securely bonded in place on the card.

Typically this bonding takes place at temperatures between 125° C. and 175° C. Although the melting temperature of the cards, which generally are made of polyvinylchloride (PVC) or a polyester, may be in the range of 212° C. for the PVC and up to 265° C. for the polyester, the cards do soften and bend and tend to change shape and become curved. If the card is warped it will not be as easy to use, so that the use of a card straightener apparatus 10 is desired.

Figure 4:
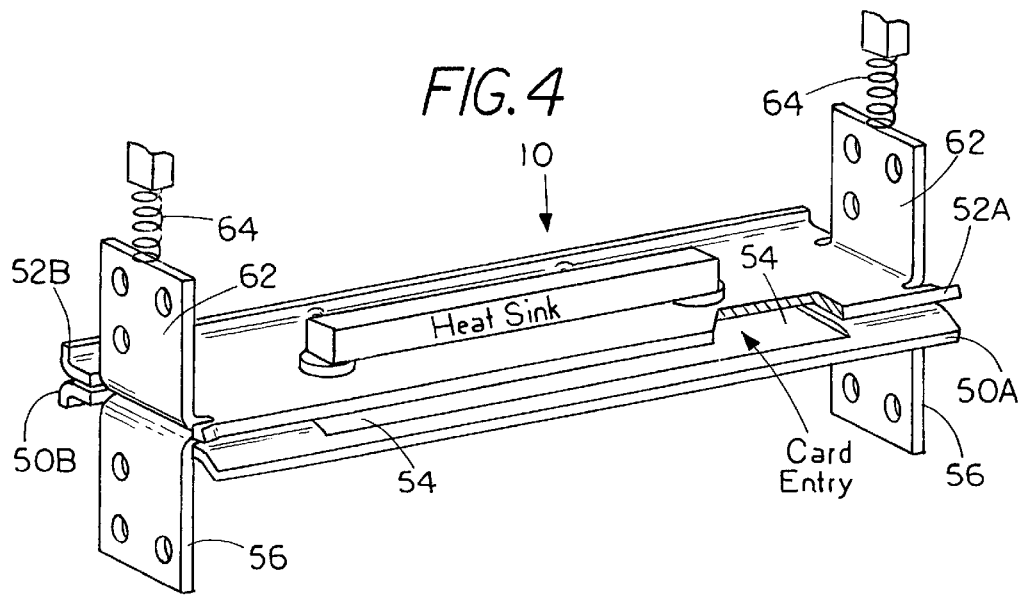
FIG. 4 is a schematic perspective view of the card straightener plates of the present invention removed from their mountings.
Figure 5:
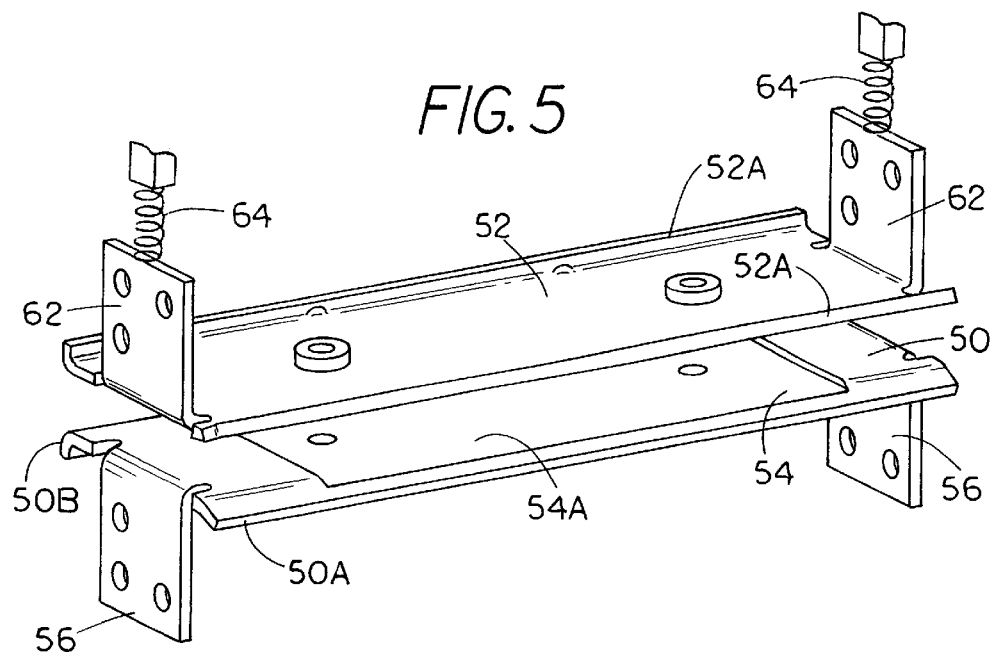
FIG. 5 is a perspective view similar to FIG. 4 with the plates separated to illustrate details.

The card straightener apparatus 10 is mounted closely adjacent to the output side of the heated roll 24 and the drive roll 36 of the lamination station 23. A card 14A will be received between a fixed base plate 50, and a spring-loaded upper plate 52 while a portion of the card is still in the lamination station 23 as shown. The plates 50 and 52 have input lips or bent-up edges 50A and 52A, which guide the card between them. Also, as shown in FIGS. 4 and 5, where supports and heat sinks are removed, the plates 50 and 52 have wide shallow grooves 54 in the center portions, which are of size to receive a card and keep it straight as it moves across the plates 50 and 52. The plates also have output lips shown at 52B and 50B, respectively.

The lower plate 50 is supported securely on brackets 56 that extend downwardly and which are attached to side walls 48 and 48A. The plate 50 has a heat sink 58 in heat conducting relation thereto. The heat sink is preferably a base 59 that readily conducts heat, such as aluminum, and includes a plurality of transversely extending spaced fins 60. The fins are integral with the base and provide heat radiation surfaces for reducing the temperature of card 14A as it passes between the plates 50 and 52.

Figure 3:
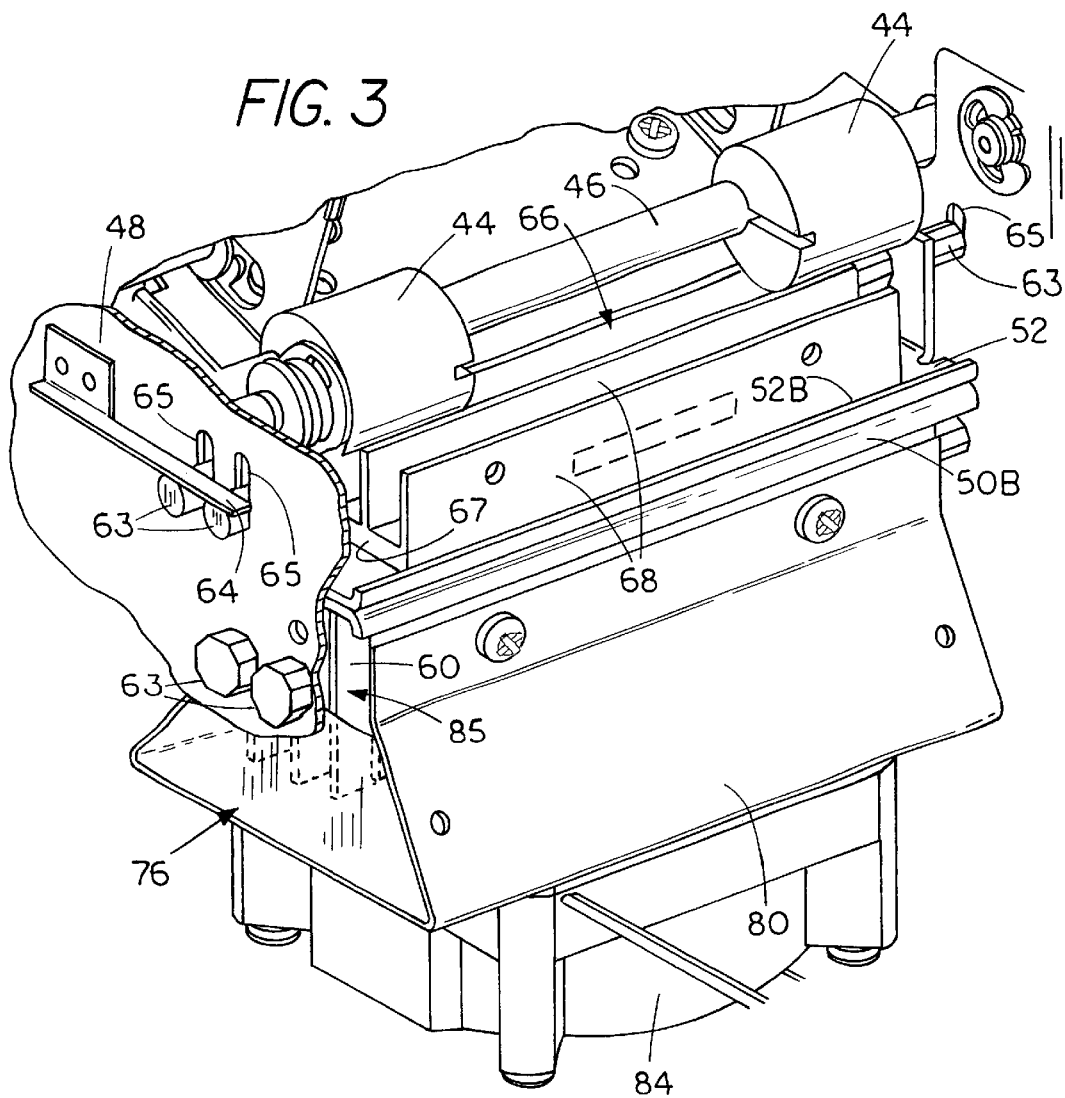
FIG. 3 is a perspective view of the card straightener taken from an opposite side from FIG. 2 with parts broken away.

The upper plate 52 is mounted onto brackets 62 which are spring-loaded with suitable leaf springs 64 shown schematically in FIG. 3, as well as in FIG. 4. The brackets 62 have studs 63 thereon which pass through slots 65 in walls 48 and 48A. The leaf springs are on the outside of the walls and bear on heads of the studs. Reduced diameter portions of the studs slide in the slots 65.

The springs 64 can be mounted in any suitable manner relative to side plates 48 and 48A, and the springs provide an adequate force to keep the card 14A contiguous with both of the cooling plates. A heat sink 66, having a base 67 and fin 68 is mounted in heat conducting relationship with the upper plate 52, and aids in conducting heat away from the card 14A as it moves across plate 52.

The output edge of the plates 50 and 52 are aligned with a pair of drive rollers 70 and 72. The roller 70 is a pinch roller that provides a pressure to urge the card against the drive roller 72, which is driven with a motor 74. The card 14A is then passed through the straightener, and as can be seen, is straightened.

The heat sink 58 on lower plate 50 is used to support a housing 76 which has a base wall 78. Housing 76 has bent-up solid side walls 80 that are attached to the outer fins 60 to form an internal chamber 82. A fan illustrated schematically at 84 in FIG. 1 is mounted on base wall 78 and provides airflow upwardly toward the heat sink 60. The air is taken in from the exterior of the chamber 82 and introduced through a hole in base 78 and will be forced outwardly along the fins 60 and laterally to the sides of the heat sink. The cooling air flows along the fins 60 and out the openings at the ends of the housing 76. One typical opening 85 is shown in FIG. 1. The end openings can be configured as desired.

A controller 90 controls the laminator and printer. The fan is preferably run continuously while the laminator is operating to promote cooling of the card so it becomes straightened and rigid.

The flat plates, such as that shown at 50 and 52, have sufficient fore and aft length between the lips 52A and 52B, and the lips 50A and 50B, so that the softened, hot card 14A will be supported along a flat surface so that it will cool and become rigid while supported on a flat surface.

The card 14B can be further processed, for example, it can be inverted and sent back through the laminator (with the cams lifting the heated roller) and then a second side of the same card can be laminated.

The spring loading of the top plate 52 permits a card to pass between the plates under some compression load, but spaced sufficiently so that the card goes through easily. The gap formed by grooves 54 is slightly less than the thickness of the card, and thus each groove is slightly less than one-half the thickness of the cards. The heat sink 66 on plate 52 radiates heat and conductively cools so it also acts to cool the card quickly.

While one set of plates 50 and 52 have been shown, more than one can be utilized in series, or the length in direction of travel can be changed. The grooves in the center of the plates keep the card from being skewed or misaligned, and the spring-load insures contact of the plates and laminator card. The grooves 54 are of size so the plates have to separate slightly to let the card 14A pass through sending a regulated spring-load.

Figure 6:
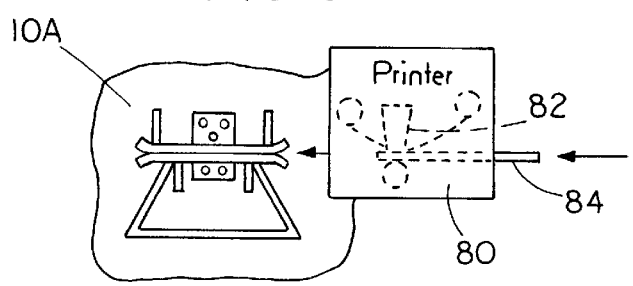
FIG. 6 is a schematic representation of the card straightener used with a printer.

The card straightener also can be used for straightening a card that is heated to a level where it is softened or warps during the printing process, as shown in FIG. 6 where a card printer 80 is shown with a heated printhead 82 to print on a card 84 using a thermal process, where the printhead is heated to transfer printing from a ribbon such as a thermal dye sublimation or thermal resin ribbon to the card 84. The card can reach temperatures where it will warp or curl.

A card straightener 10A, constructed the same as card straightener 10 receives a card from printer 80 and will return the card to its planar condition as described above.

Although the present invention has been described with reference to preferred embodiments, workers skilled in the art will recognize that changes may be made in form and detail without departing from the spirit and scope of the invention.

What is claimed is:

1. A card straightening apparatus for restoring a planar condition to a card subjected to heating comprising a pair of generally flat plates for supporting the card comprising an upper flat plate and a lower flat plate of heat conducting material, the upper plate being spring loaded toward the lower plate, a heat sink on the lower plate comprising a plurality of spaced fins to conduct heat from the lower flat plate causing a card supported on the plate to cool to a planar condition, at least one of said plates having a groove extending across such plate for receiving a card and guiding sides of such card as such card moves across the plate.

2. The card straightening apparatus of claim 1 used in combination with a lamination station having a heated element for applying a laminate to a card on one side thereof, said heated element heating the card to cause the card to deform out of a planar condition, the flat plates being immediately adjacent an outlet of the laminator, and the heat sink on the lower flat plate being on an opposite side of the card from the heated roller.

3. The card straightening apparatus of claim 1, wherein there is a second heat sink attached to said upper plate for conducting heat away from the upper plate.

4. The card straightening apparatus of claim 1, wherein said lower plate is supported on a housing, said housing defining an interior chamber containing the heat sink and fins, and a fan to discharge air into the interior chamber and across the fins, the housing having an outer opening for discharge of air from the interior chamber.

5. In combination with a card processing station for processing an identification card, wherein the card is heated to a point where it deviates from a plane, a card straightener comprising a first lower support plate positioned closely adjacent an outlet of said processor for receiving a heated card and supporting said card along a plane, a second upper plate, a spring for urging the second plate toward the first support plate to urge the card against the first support plate, and a heat sink attached to the first support plate for conducting heat away from said first support plate and a card supported thereon to cool the card below a temperature which causes the card to be softened, each of the plates having a groove formed on facing surfaces of the plates, each groove having spaced side edges to guide a card passing across the plates, and each groove having a depth less than one-half of the thickness of a card being straightened, such that the second plate has to move away from the first plate under a spring load when the card passes across the plates while in the groove in each plate.

6. The combination of claim 5, and a heat sink in heat conducting relation to the second plate.

7. The combination of claim 6, wherein said heat sinks comprise a plurality of planar walls that form fins extending along the plates.

8. The combination of claim 6, and a fan for providing a flow of air across the fins on a heat sink on at least one of the plates.

9. The combination of claim 5, wherein the processor is one of a printer having a heated printhead for printing on the card and a lamination station for laminating material on the card.

\* \* \* \* \*